Jan. 15, 1935.   J. MARTIN   1,988,129
CHUCK DEVICE
Filed Feb. 6, 1933   2 Sheets-Sheet 2
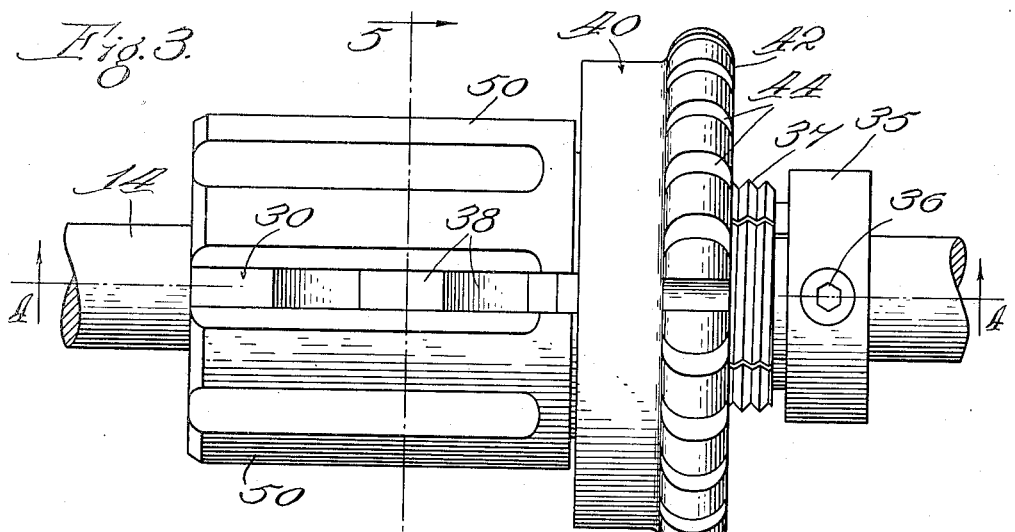
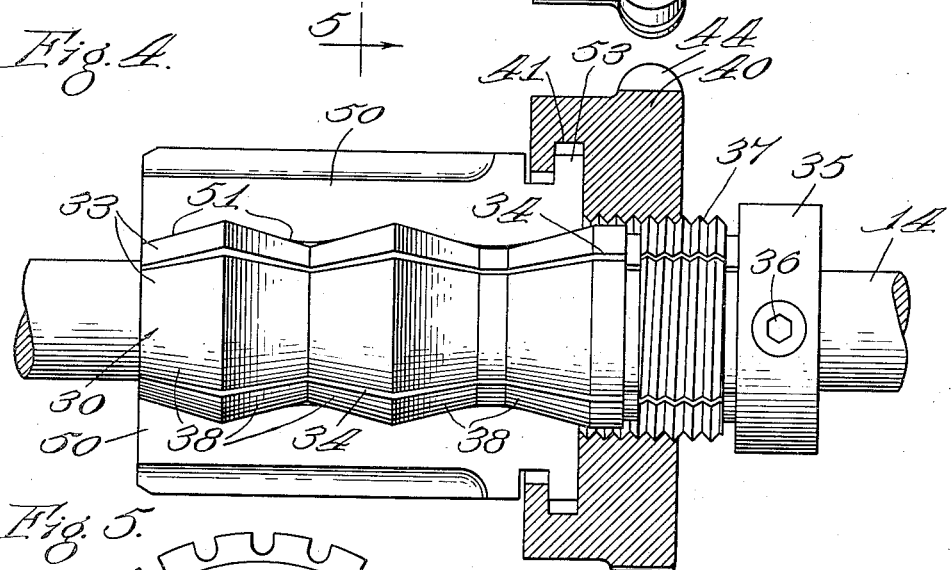
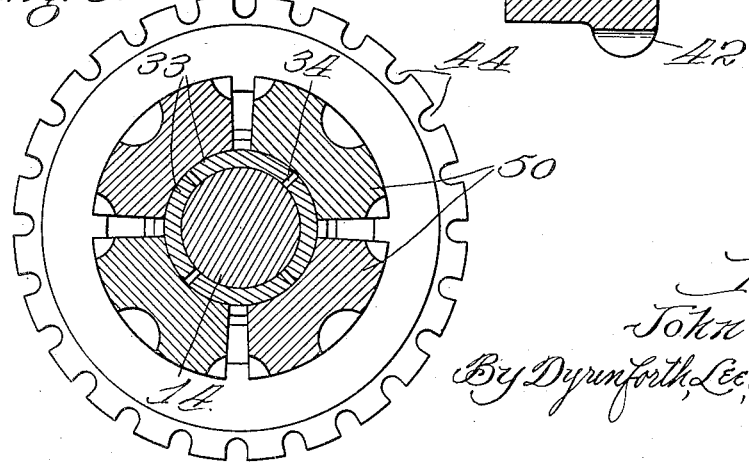
Inventor:
John Martin.
By Dyrenforth, Lee, Chritton & Wiles
Att'ys.

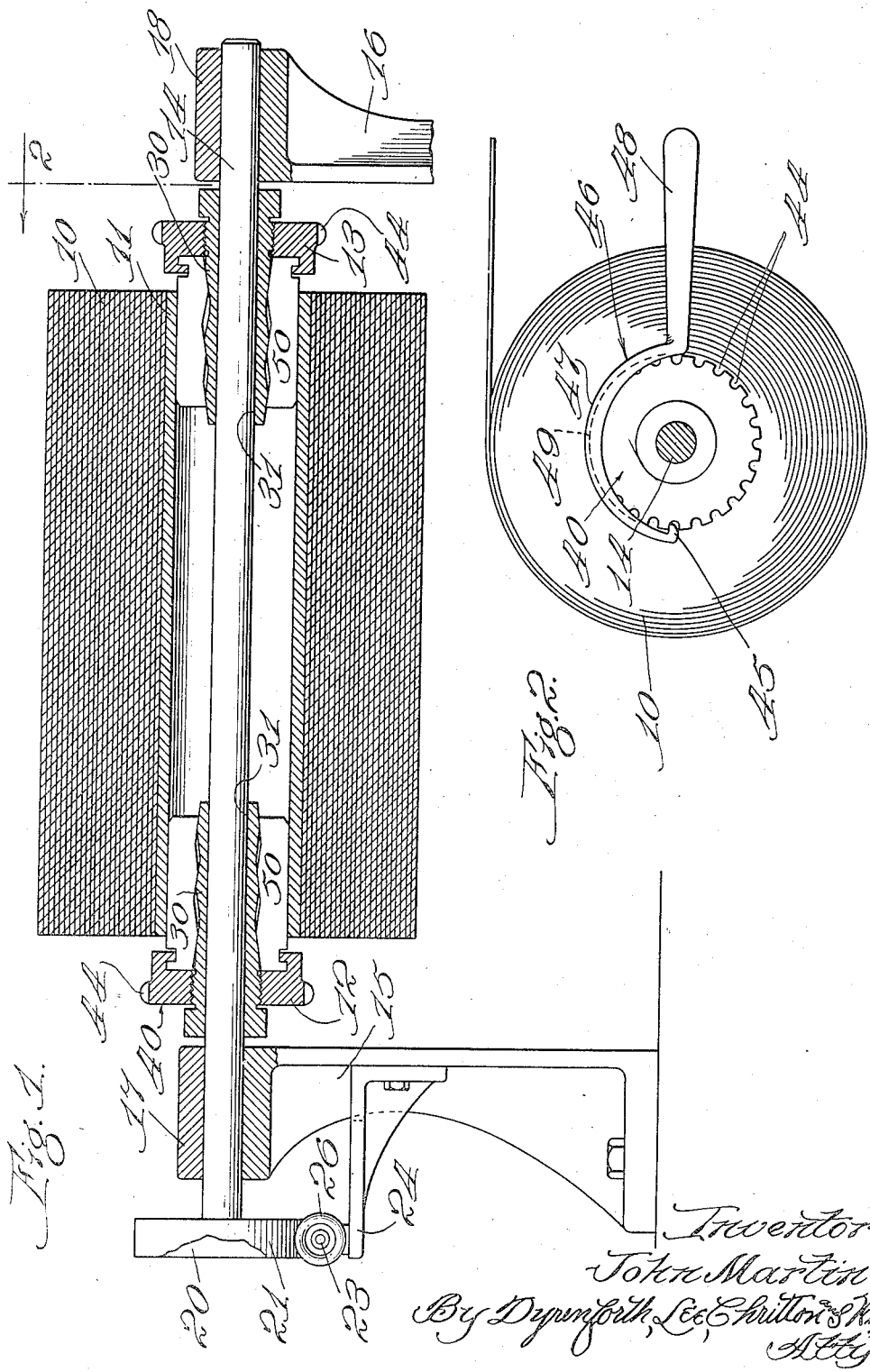

Patented Jan. 15, 1935

1,988,129

UNITED STATES PATENT OFFICE 1,988,129

CHUCK DEVICE

John Martin, Omaha, Nebr.

Application February 6, 1933, Serial No. 655,493

1 Claim. (Cl. 242—68)

The invention relates to chuck devices and is particularly adapted to be employed in combination with spindles or shafts for holding rolls of paper, or the like.

One form of the invention is embodied in apparatus comprising a spindle or shaft upon which two of the improved chucks are mounted, both of the chuck devices being preferably removable from the spindle or shaft. Each chuck device comprises a central tubular arbor which is split part way longitudinally thereof and fits snugly upon the spindle or shaft. A set screw preferably secures the arbor to the shaft. A collar screwthreaded upon the arbor may be adjusted to displace a plurality of jaws longitudinally of the arbor, the jaws and arbor being provided with co-operating surfaces which cause the jaw members to be displaced outwardly or inwardly, depending upon the direction the collar is rotated, with respect to the longitudinal axis of the spindle or shaft. The co-operating surfaces also cause the split end of the arbor to contract or expand, the construction being such that when the jaw members are displaced outwardly the arbor contracts and frictionally engages the spindle or shaft. When the arbor contracts in this manner, it co-operates with the associated set screw to prevent the arbor from being displaced longitudinally or angularly with respect to the spindle or shaft. The two chucks are adapted to hold a roll of paper through which the shaft or spindle projects, the shaft or spindle being removably journaled in suitable bearing devices. One end of the shaft or spindle is provided with braking means so that when paper is withdrawn from the roll in such manner that the roll and the apparatus carrying it rotates, the braking means can be adjusted to prevent overrunning of the roll.

When a roll of paper is to be mounted on the shaft or spindle, one of the chucks is removed therefrom and the shaft or spindle is inserted through the central hole in the roll. The chuck is then replaced upon the shaft or spindle and the two chucks are adjusted so that they frictionally engage the roll and the shaft or spindle with sufficient force to prevent displacement of these parts relative to each other.

Other advantages will become apparent as the following detailed description progresses, reference being had to the accompanying drawings, where—

Fig. 1 is a longitudinal section taken through apparatus which embodies the invention.

Fig. 2 is a section taken on line 2—2 of Fig. 1.

Fig. 3 is a side elevation of an improved chuck which forms part of the apparatus illustrated in Fig. 1.

Fig. 4 is a section taken on line 4—4 of Fig. 3, the tubular arbor of the chuck and the shaft being shown in elevation, and Fig. 5 is a section taken on line 5—5 of Fig. 3.

Referring to the drawings wherein a preferred embodiment of the invention is illustrated, the reference character 10 designates a roll of paper provided with a central tubular member 11 upon which the paper is wound. The tubular member 11 may be made from cardboard, or the equivalent. In the heavier weights of paper, the tube 11, or the equivalent thereof, may be omitted and the innermost turns of the paper will have the same function as the tube 11. The roll 11 is mounted on chucks 12 and 13 of improved construction, the chucks 12 and 13 being mounted upon a shaft or spindle 14 journaled in bearing brackets 15 and 16. The bearing brackets 15 and 16 comprise cap members 17 and 18, respectively, which may be removed to permit removal of the spindle or shaft 14 from the brackets 15 and 16. At one end, the shaft or spindle 14 is provided with a brake drum 20 engageable by a brake band 21 operatively connected to a shaft 23 which is journaled in a bracket 24, the bracket 24 being mounted on the bearing bracket 15. The shaft 23 is provided with a hand wheel 26 and suitable mechanism (not shown) operatively connects the shaft 23 with the brake band 21 so that the hand wheel 26 may be rotated to bring the band into or out of effective frictional engagement with the brake drum 20. The construction of the brake mechanism does not form a part of this invention and need not be described in any further detail. The chucks 12 and 13 are substantially identical in construction, the only difference between the two chucks is that one is provided with right hand screw threads and the other is provided with left hand screw threads. This construction is employed so that the chucks will tend to expand when the roll 10 is being rotated to unwind the paper therefrom. In view of the similarity of the two chucks, only one of them will be described in detail, but the same reference characters will be applied to the similar parts of the other. The chuck 13 is shown in section in Fig. 1 and enlarged views of it are shown in Figs. 2, 3, 4 and 5.

The chuck 13 comprises a tubular arbor 30 having a central bore 31 which fits snugly on the shaft or spindle 14. The arbor 30 is split longitudinally part of the length thereof to provide four jaw-like bars 33 engageable with the shaft or spindle 14. The slots between the jaw-like bar 33 are shown at 34. These slots extend from the left hand end (Fig. 4) of the arbor to a collar 35 formed integral with the jaw-like bars 33. A set screw 36 screw-threaded into the collar 35 may be adjusted to secure the arbor 30 in adjusted positions upon the shaft or spindle 14. Adjacent the collar 35, the arbor 30 is provided with screw-threads 37 through which the slots 34 preferably extend. The jaw-like bars 33 are provided with tapered or frustro-conical surfaces 38 for a purpose which will presently appear. It will be noted that the frustro-conical surfaces 38 taper in both directions.

Screw-threaded upon the screw-threads 37 is a collar 40 provided with an inwardly opening annular groove 41. An annular bead 42 formed integral with the collar 40 is provided with a plurality of notches 44 extending longitudinally of the collar. The notches 44 are engageable by a lug 45 formed integral with a spanner wrench 46 which comprises an arcuate portion 47 and a handle 48 (see Fig. 2). The arcuate portion 47 has a recess 49 in its inner surface, which recess 49 conforms approximately to the curvature of the bead 42, both longitudinally and transversely thereof. This construction enables one to grasp the handle 48 and angularly displace the spanner wrench 46 in a counter clockwise direction (Fig. 2) around the bead 42 to have the lug 45 engage another notch 44 whereupon the spanner wrench may be displaced in a clockwise direction to rotate the collar 40 relative to the arbor 30. If one desires to rotate the collar in an opposite direction, it is only necessary to reverse the spanner wrench 46.

Obviously when the collar 40 is displaced angularly on the arbor 30, the collar is displaced longitudinally of the arbor, the direction of displacement depending upon the direction in which the collar is rotated.

Disposed around the arbor 30 and extending longitudinally thereof are four jaw members 50 which are provided with tapering or frustro-conical surfaces 51 slidably engaging the tapering or frustro-conical surfaces 38. Each jaw member 50 is provided at one end with an outwardly extending arcuate flange 53 which normally rides in the groove 41, the construction being such that when the collar 40 is displaced angularly to displace it longitudinally of the arbor, the jaw members 50 will be displaced longitudinally of the arbor 30 the same distance and the frustro-conical surfaces 51, will ride up or down on the frustro-conical surfaces 38. It will be readily understood that if the collar 40 is rotated to displace it to the right or to the left (Fig. 4) some of the frustro-conical surfaces 51 will ride up on the co-operating frustro-conical surfaces 38 so that the jaw members 50 will be displaced outwardly with respect to the longitudinal axis of the spindle or shaft 14 and will frictionally engage the tube 11. After the jaw members have been displaced outwardly so far as the tube 11 will permit, continued rotation of the collar 40 in the same direction will cause the frustro-conical surfaces 51 and 38 to co-operate in such manner that the split end of the arbor will contract and frictionally engage the shaft or spindle 14. When the roll is to be released or the tube 11 is to be removed from the shaft or spindle 14, the collars 40 of the chucks 12 and 13 are rotated in the proper directions to have the jaw members 50 of each chuck move towards each other. Before the chucks are adjusted in this manner, it is preferable to remove the shaft or spindle 14 from the bearing brackets 15 and 16. After the chucks have been adjusted to release the tube 11, one of the chucks is removed from the shaft or spindle. The tube 11 is then removed from the shaft or spindle. The spindle or shaft may then be inserted through the tube 11 of another roll 10 of paper and the chuck which was removed may be replaced. The collars 40 of the chucks are then rotated to have the jaw members effectively grip the inner surface of the tube 11 and to have the chuck-like bars 33 effectively grip the shaft or spindle. The shaft or spindle is then replaced in the bearing brackets 15 and 16.

It will be readily understood that it will be preferable to provide a plurality of shafts 14 for each set of bearing brackets 15 and 16, each shaft being provided with chucks 12 and 13. Then when it becomes necessary to renew the supply of paper, another roll which has had one of the shafts 14 inserted therein and secured thereto by chucks 12 and 13 may be assembled with the bearing brackets 15 and 16 so soon as the exhausted roll is removed therefrom.

As stated above, the brake drum 20 and the brake mechanism associated therewith provides means whereby the shaft 14 and the roll 10 mounted thereon may be prevented from overrunning. Such construction is well known in the paper industry.

I claim:

A chuck for securing a tubular member to a shaft, or the equivalent, which chuck comprises an arbor mounted on the shaft, one end of said arbor being split longitudinally thereof to provide bars engageable with said shaft, said split end being provided with frustro-conical surfaces having longitudinal axes co-incident with the longitudinal axis of the shaft, said frustro-conical surfaces tapering in both directions so that the large diameter of one frustro-conical surface joins with the large diameter of an adjacent frustro-conical surface, entirely indepependent jaw members having surfaces conforming to and engaging said frustro-conical surfaces, and a collar screw-threaded on said arbor for displacing said jaw members longitudinally of said arbor whereby said frustro-conical surfaces force said jaw members inwardly or outwardly in radial directions with respect to said shaft to force said bars into or release them from effective frictional engagement with said shaft.

JOHN MARTIN.